United States Patent [19]

Heinrich et al.

[11] Patent Number: 5,225,509
[45] Date of Patent: Jul. 6, 1993

[54] METHOD FOR DEODORIZING SIC-LINKED POLYETHERSILOXANES

[75] Inventors: Lothar Heinrich; Helmut Schator, both of Essen, Fed. Rep. of Germany

[73] Assignee: Th. Goldschmidt AG, Essen, Fed. Rep. of Germany

[21] Appl. No.: 861,532

[22] Filed: Apr. 1, 1992

[51] Int. Cl.$^5$ .................................. C08G 77/06
[52] U.S. Cl. ........................ 528/12; 528/14; 528/15; 528/31; 528/25; 556/445; 525/474
[58] Field of Search ............ 525/474; 528/15, 31, 528/25, 14, 12, ; 556/445

[56] References Cited

U.S. PATENT DOCUMENTS

| | | | |
|---|---|---|---|
| 4,515,979 | 5/1985 | Otsuki et al. | 556/445 |
| 4,520,160 | 5/1985 | Brown | 524/765 |
| 4,847,398 | 7/1989 | Mehta et al. | 556/445 |
| 4,857,583 | 8/1989 | Austin et al. | 524/761 |
| 5,118,764 | 6/1992 | Ichinohe et al. | 525/398 |

FOREIGN PATENT DOCUMENTS 0398684 11/1990 European Pat. Off. .

Primary Examiner—John C. Bleutge
Assistant Examiner—M. W. Glass
Attorney, Agent, or Firm—Anderson, Kill, Olick & Oshinsky

[57] ABSTRACT

A method for deodorizing polyoxyalkylene polysiloxane mixed block polymers wherein the polysiloxane blocks are linked to the polyether blocks through SiC linkages is disclosed. Hydrogen is allowed to act on the mixed block polymers in the presence of hydrogenation catalysts at temperatures of 20° to 200° C. and a pressure of 1 to 100 bar for a period of 0.5 to 10 hours.

6 Claims, No Drawings

METHOD FOR DEODORIZING SIC-LINKED POLYETHERSILOXANES

FIELD OF INVENTION

The invention generally relates to polyoxyalkylene polysiloxane mixed block polymers wherein the polysiloxane blocks are linked to the polyether blocks through SiC linkages. The invention is particularly concerned with a method for deodorizing such polyoxyalkylene polysiloxane mixed block polymers.

BACKGROUND INFORMATION AND PRIOR ART

Polyoxyalkylene polysiloxane mixed block polymers wherein the polysiloxane blocks are connected with the polyether blocks through SiC linkages are generally, from a technical point of view, prepared by an addition reaction between alkene polyethers, particularly allyl polyethers, and hydrogen siloxanes in the presence of platinum catalysts.

Such polyoxyalkylene polysiloxane mixed block polymers may correspond to the general formula

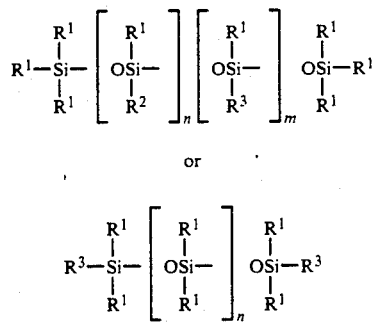

or

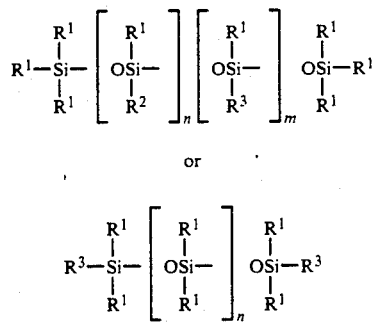

wherein
$R^1$ = alkyl, usually methyl;
$R^2$ = alkyl with 2 to 20 carbon atoms;
$R^3 = (CH_2)_3O(C_2H_4O)_x(C_3H_6O)_yR^4$;
$R^4$ = hydrogen or alkyl with 1 to 4 carbon atoms;
n = 0 to 100;
m = 1 to 8,
x = 1 to 25; and
y = 0 to 25.

In the preparation of such polymers, an excess of allyl polyethers is employed and, in so doing and under the conditions of the addition reaction, a portion of the allyl polyethers is rearranged into the propenyl polyethers, which are not capable of entering the addition reaction.

Polyoxyalkylene polysiloxane mixed block polymers of the above indicated kind thus contain generally moieties of unreacted allyl polyethers and propenyl polyethers.

Such SiC linked polyoxyalkylene polysiloxane mixed block polymers are preferred as stabilizers in the production of polyurethane foams, as emulsifiers, separating agents, and as active ingredients in cosmetic products. However, they possess a more-or-less strongly noticeable distinct and unpleasant acrid odor which has a tendency to become stronger upon storage. This odor, of course, is an obstacle to the use of mixed block polymers of the indicated kind, and particularly when the polymers are to be used as active ingredients in cosmetic preparations.

Attempts have been made in the past to remove the odor forming components by blowing with inert gas or by treatment with steam. However, it has been ascertained that even if the odor forming components can initially be removed by such treatment, the odor, upon storage of the polymers or after the polymers have been mixed into cosmetic formulations, has a tendency to reappear.

EP-A-O 398 684 is concerned with the removal of such odor forming components. More particularly, the European patent application referred to is concerned with a purified polyether siloxane which has been treated in a closed system for a period of 24 hours with $10^{-4}$n aqueous hydrochloric acid in the amount of up to 1000 ppm, calculated on polyether, at 60° C. The product thus purified was then treated at reduced pressure with steam in order to remove the aldehydes and ketones which were formed during the acid treatment.

However, it was found disadvantageous that for the removal of the formed aldehydes and ketones, and calculated on the weight of the treated polyether siloxanes, about 1½ as much steam had to be used. The procedure thus results in considerable amounts of acidic condensates of obnoxious odors which are difficult to dispose of.

An additional disadvantage of the acidic treatment referred to resides in the fact that if the polyether siloxane should contain residual SiH groups, oftentimes the formation of gel particles can be observed. These gel particles are difficult to remove by filtration.

Another known procedure for deodorizing polyoxyalkylene polysiloxane mixed block polymers is disclosed in U.S. Pat. No. 4,515,979. In accordance with the procedure there disclosed, phytic acid is added to the mixed block polymers during or after their preparation. As stated in the patent, the phytic acid used in the procedure referred to is a hexaphosphate ester compound of myoinositol represented by the molecular formula $C_6H_{18}O_{24}P_6$ and is a compound which is known as a nontoxic, natural product occurring in abundance in corn, seeds, and the like in the plant kingdom. This product is not suitable for use on an industrial scale—one reason being the high cost of the product.

OBJECTS OF THE INVENTION

It is a primary object of the invention to provide a simple procedure for deodorizing polyoxyalkylene polysiloxane mixed block polymers which is suitable for industrial application, which is simple to carry out and results in products which are free of disturbing by-products.

A further object of the invention is to provide a procedure of the indicated kind which not only effectively removes the odor from the polymers, but which also avoids the formation of waste products which are difficult to dispose of or which at least minimizes the formation of such waste products.

SUMMARY OF THE INVENTION

Briefly, and in accordance with the invention, the mixed block polymers of the indicated kind are subjected to the action of hydrogen in the presence of hydrogenation catalysts at temperatures of about between 20° to 200° C. and at a pressure of about 1 to 100 bar for a period of about 0.5 to 10 hours.

Preferably, the hydrogen is allowed to act on the mixed block polymers at temperatures of about between 110° to 140° C. and a pressure of about between 2 to 15 bar.

As regards the catalysts, hydrogenation catalysts of the kind well known in the art may be used. Particularly suitable are nickel, copper, chromium or the metals of the platinum group. The catalysts may be precipitated on a suitable carrier material. Particularly preferred, and due to relatively low price but high reactivity and long life, are nickel catalysts.

Generally the catalysts are used in an amount of between about 0.003 to 1% by weight of metal, calculated on the polyether siloxanes.

In a preferred embodiment of the invention, the inventive procedure is carried out in such a manner that acidic clay and water in amounts of 0.1 to 1.0% by weight are added to the mixed block polymer or an aqueous buffer solution with a pH value of 3 to 6 are additionally added to the block polymer.

As acidic clay, bleached earth activated with acid can, for example, be used. As buffer solutions, aqueous solutions of inorganic and/or organic acids and salts can be used which have a pH value of 3 to 6 as, for example, citric acid phosphate buffer or citrate buffer pursuant to Sorensen.

After the hydrogen has acted o the polyoxyalkylene polysiloxane mixed block polymers, the catalysts can be separated in a suitable manner—for example, by filtration or centrifuging from the polyoxyalkylene polysiloxane mixed block polymers.

Since the polyoxyalkylene polysiloxane mixed block polymers ar frequently products of high viscosity, it is then advantageous to carry out the hydrogenation of the polymers in the presence of suitable solvents.

The polyoxyalkylene polysiloxane mixed block polymers treated in accordance with the invention are free of disturbing odors. The odor does not reappear upon storage of the polymers or after they have been worked into cosmetic formulations.

A particular advantage of the inventive procedure is that the treated polyoxyalkylene polysiloxane mixed block polymers and their solutions do not contain any gel-like moieties. The products or their solutions treated in accordance with the invention are clear, largely colorless and devoid of opalescence.

Moreover, it has surprisingly been ascertained that the stabilizing action of the mixed block polymers treated in accordance with this invention is improved in the manufacture of polyurethane foams. This is demonstrated generally by an increase in the flow length of the polyurethane foams and in the decrease of foam disturbances. Thus, the inventive procedure results in polyoxyalkylene polysiloxane mixed block polymers which are not only free of obnoxious odors and remain free thereof, but also in an improvement of their application-technical characteristics.

The invention will now be described in further detail by the following examples, it being understood that these examples are given by way of illustration and not by way of limitation.

For the hydrogenation a 1-liter autoclave with gas introduction stirrer is used. The catalyst is enveloped by the polymer and is charged with the polymer into the autoclave. The autoclave is closed and is rendered airfree by evacuation and introduction of hydrogen. This procedure is repeated three times. After heating to the hydrogenation temperature the required pressure is set by the addition of hydrogen. The hydrogenation is accomplished in such a manner that in each case, after a pressure drop of 1 bar, the starting pressure is again readjusted by the introduction of hydrogen. After termination of the treatment with hydrogen, the pressure in the autoclave is released and the contents filtered under an inert gas atmosphere.

EXAMPLE 1

This experiment was carried out with polyoxyalkylene polydimethylsiloxane mixed block polymers having 25 to 30 Si Atoms, 60 to 70 oxyethylene units and 10 to 20 oxypropylene units and having an average mole weight of 6000. The polymer contained 40% excess, calculated on the $\equiv$SiH employed of polyoxyethelenes not capable of addition reaction. 700 grams of this polymer was hydrogenated in the presence of 1 gram of nickel catalyst with 60% nickel on Kiselgur in the pressure range of 6/5 bar at 120° C. for one hour. The hydrogen consumption amounted to 6.5 liters under normal conditions. After filtration at 120° C. in a nitrogen atmosphere, a colorless, clear product was obtained which was devoid of unpleasant, acrid odor. No odor of this kind could be ascertained after ten weeks of storage. Additionally, by means of a rapid method, the product was tested for subsequent odor formation in that 1 gram of hydrogenated polymer was acidified in 10 grams of water with citric acid to a pH of 3-4. Also, in this test, no acrid odor could be ascertained after one week, or even after six weeks.

EXAMPLE 2

Hydrogenation was carried out as in Example 1 but, in addition to the nickel catalyst, 1.4 grams of acidic clay (available on the market under the designation Tonsil L 80 FF) and 3.5 grams of distilled water were added to the mixture. The hydrogen consumption remained unchanged and was the same as in Example 1. The product thus obtained has the same characteristics as in Example 1. The hydrogenation period was shortened to 30 minutes.

EXAMPLE 3

The hydrogenation was carried out as in Example 1 but, in addition to the nickel catalyst, the mixture was admixed with 3.5 grams of a buffer mixture consisting of A: 1 part by weight of m-$H_3PO_4$, 2 parts by weight of n NaOH, and 2 parts by weight of water; and B: 21.0 grams of citric acid $H_2O$ for 1 liter of water in a mixing ratio of A:B=22:78, with a pH value of 3.4. The hydrogen consumption corresponded to that in Example 1. The final product had the same characteristics as in Example 1. The hydrogenation period was shortened to 45 minutes.

EXAMPLE 4

This experiment was carried out with 700 grams of a polyoxyalkylene polydimethylsiloxane mixed block polymer having 40 to 60 Si atoms, 90 to 110 oxyethylene units and 90 to 110 oxypropylene units and having an average mole weight of 16,000. The polymer contained 40% of excess of polyoxyalkylene not subject to addition reaction. The product was hydrogenated in the presence of 0.5 gram of the catalyst described in Example 1, in the pressure range of 15/14 bar at 140° C. for 3 hours. The hydrogen consumption amounted to 1 liter under normal conditions. After filtration under the conditions described in Example 1, a colorless, clear product was obtained which was devoid of acrid odor. Also, the rapid method described in Example 1 did not result in the detection of any subsequent odor formation.

A polyurethane hard foam production was carried out both with the hydrogenated and with the non-hydrogenated polymer. The following formulation was used:

100 parts hard foam polyol with an OH number of 520;
1.5 parts water;
2.0 parts dimethylcyclohexylamine;
1.0 parts mixed block polymer as stabilizer, one of the stabilizers having been treated according to the invention and, for comparison purposes, the other one had not;
40.0 parts of trichlorofluoromethane; and
155.0 parts of a crude diphenylmethyldiisocyanate.

The respective formulations were foamed in an L-shaped tube. The flow length of the foam was measured and compared.

The foam with the hydrogenated stabilizer had a flow length 8% greater than that of the non-hydrogenated stabilizer. The pore structure was visually compared. The foam with the hydrogenated stabilizer showed considerably fewer foam defects.

EXAMPLE 5

This Example was carried out with 700 grams of a polyoxyalkylene polydimethylsiloxane mixed block polymer having 20 to 30 Si atoms, 80 to 120 oxyethylene units, and an average mole weight of 5000. The polymer contained 35% excess of polyoxyalkelenes not subject to addition reaction. The polymer was hydrogenated in the presence of 0.5 gram of nickel catalyst with 60% nickel on Kiselgur in the pressure range of 15/14 bar at 130° C. for 2 hours. The hydrogen consumption was 4.5 liters under normal conditions. As in Examples 1 and 2, no odor formation was observed within six weeks, both with the hydrogenated product and with testing pursuant to the rapid method described. As in Example 2, a comparison polyurethane hard foam production was carried out with the polymer. The values of the foam, which were outside of the specification in the use of non-hydrogenated product, were within the specification with the product hydrogenated pursuant to the invention.

We claim:

1. A method for deodorizing polyoxyalkylene polysiloxane mixed block polymers wherein the polysiloxane blocks are linked to the polyether blocks through SiC linkages, said method comprising causing hydrogen to act on the mixed block polymer in the presence of a hydrogenation catalyst at temperatures of about between 20° to 200° C. and at a pressure of about 1 to 100 bar for a period of about 0.5 to 10 hours.

2. A method as claimed in claim 1, wherein the hydrogen is caused to act on the polymer at temperatures of about between 110° to 140° C.

3. A method as claimed in claims 1 or 2, wherein the hydrogen is caused to act on the polymer at a pressure of about between 2 to 15 bar.

4. A method as claimed in claim 1, wherein the hydrogenation catalyst is Ni, Cu, Cr or a metal of the platinum group.

5. A method as claimed in claim 1, wherein the hydrogen is caused to act on the polymer in the presence of 0.1 to 1% by weight of acidic clay and 0.1 to 1% by weight of water.

6. A method as claimed in claim 1, wherein the hydrogen is caused to act on the polymer in the presence of an aqueous buffer solution of a pH value of 3 to 6.

* * * * *